United States Patent [19]

Bell

[11] 3,943,116

[45] Mar. 9, 1976

[54] METHOD FOR PREPARING HIGH CIS POLYALKENAMERS

[75] Inventor: Anthony J. Bell, Stow, Ohio

[73] Assignee: The Goodyear Tire & Rubber Company, Akron, Ohio

[22] Filed: June 21, 1974

[21] Appl. No.: 481,568

[52] U.S. Cl. ...... 260/93.1; 260/30.8 R; 260/88.2 E; 260/88.2 F
[51] Int. Cl.² .................. C08F 4/14; C08F 4/52
[58] Field of Search.......... 260/93.1, 88.2 E, 88.2 F; 450/658, 659

[56] References Cited
UNITED STATES PATENTS 3,440,179  4/1969  Bayer et al. .................... 252/429
3,830,877  8/1974  Dall'Asta et al. .................... 260/875
3,857,825  12/1974  Streck et al. .................... 260/88.1 R Primary Examiner—Stanford M. Levin
Attorney, Agent, or Firm—F. W. Brunner; J. Y. Clowney

[57] ABSTRACT

There is disclosed a process for the preparation of high cis polyoctenamer and high cis polybutenamer or copolymers thereof by the polymerization of cyclooctene and/or 1,5-cyclooctadiene by means of a catalyst system comprising (A) an organosilicon compound, (B) a tungsten halide salt, and (C) an organoaluminum compound.

8 Claims, No Drawings

METHOD FOR PREPARING HIGH CIS POLYALKENAMERS

This invention is directed to a process for the preparation of high cis polyoctenamer and high cis polybutenamer or copolymers thereof from the ring opening polymerizations of cyclooctene and/or 1,5-cyclooctadiene by means of a catalyst system comprising (A) an organosilicon compound, (B) a tungsten halide salt, and (C) an organoaluminum compound.

By ring-opening polymerization is meant a process whereby cycloolefins, in the presence of an olefin metathesis catalyst, form high molecular weight polyalkenamers.

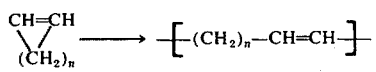

It should be noted that in polyalkenamers resulting from the ring-opening polymerization of cycloolefins, the repeating polymer segments contain the same number of carbon atoms and double bonds as the cycloolefin polymerized. This is to be contrasted with addition polymers, prepared from acyclic olefins and diolefins, wherein the polymer segments contain one less double bond than the employed olefin or diolefin monomer contained.

Recently, much emphasis has been placed on obtaining high cis polybutadiene and high cis polyisoprene from the polymerization of butadiene and isoprene, respectively, because of the certain desirable properties associated with these "high cis" elastomers.

The polymer obtained by the ring-opening polymerization of 1,5-cyclooctadiene, which may be represented as polyoctadienamer (I) or polybutenamer (II), is for the most part, the

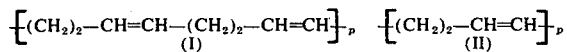

same as high 1,4-polybutadiene prepared by the addition polymerization of butadiene. One essential difference should be noted however. High 1,4-polybutadiene contains at least some vinyl side chain units as a result of the occurrence of some "1,2-addition," (along with the normal 1,4-addition), during the addition polymerization of the 1,3-butadiene monomer. Such vinyl units are totally absent in polybutenamer (II), however, owing to the mechanism inherent in ring-opening polymerizations of cycloolefins wherein the formation of such pendant groups cannot occur.

In the prior art processes of ring-opening polymerizations of cycloolefins and cyclodiolefins, somewhat less than 90 percent of the vinylene($-CH=CH-$) units of the polymer products are in the cis configuration. It is one of the advantages of the present invention that by employing the processes described herein, polyalkenamers (i.e. polyoctenamer and polybutenamer), can be obtained which have cis vinylene contents of near or greater than 90 percent.

According to the invention at least one cycloolefin selected from the group of cyclooctene and 1,5-cyclooctadiene is polymerized by means of a catalyst system comprising (A) an organosilicon compound of the formula $$R_{4-n}Si(Y)_n$$

wherein R represents any hydrocarbon fragment such as an alkyl, alkenyl or aryl radical; and Y may be selected from the group consisting of vinyl, alkylidenyl, alkoxy, aryloxy and aralkoxy radicals; n being at least 2; and (B) a tungsten halide salt of the general formula $$R_{m-n'} WX_{n'}$$

wherein X represents chlorine or bromine and R is selected from the group consisting of alkoxy, haloalkoxy, aryloxy, alkaryloxy and acetyl acetonyl radicals; m being 6 when X is Cl or 5 when X equals Br; and wherein n' may be 3 to 6 inclusive when X equals Cl or 3 to 5 inclusive when X equals Br; and (C) an organoaluminum compound of the formula $$R_1 \underset{\underset{R_3}{|}}{Al} - R_2$$

wherein $R_1$, $R_2$ and $R_3$ may independently represent an alkyl or aralkyl radical, or a halogen atom.

In (C) above, it is preferrable that the compound contain at least one aluminum to carbon bond.

Representative but not exhaustive of the compounds of the formula $$R_{4-n}Si(Y)_n$$

or (A) of the catalyst system are diphenyldivinylsilane, diallyldivinylsilane, diethyldipropylidenylsilane, dimethyldiethoxysilane, benzyltrivinylsilane, and tetravinylsilane. Vinyl or alkylidenyl radicals constitute a preferred class for the Y group.

Representative but not exhaustive of the compounds of the formula $$R_{m-n'} WX_{n'}$$

or (B) of the catalyst system are tungsten hexachloride, phenoxytungsten pentachloride, (2-chloroethoxy) tungsten pentachloride, ethoxytungsten tetrabromide, di-(2-chlorophenoxy) tungsten tetrachloride, triethoxytungsten trichloride and acetylacetonyl tungsten pentachloride.

Certain of these tungsten salts may be prepared by modifying $WCl_6$ or $WBr_5$ with materials containing OH groups such as alcohols or phenols. This modification seems to improve the performance of the catalyst system in that in some cases the catalyst seems to give a higher polymerization rate and in other cases prevents or supresses the formation of gel in the final polymer. For instance, it has been found that if lower alkyl alcohols or phenols such as ethyl alcohol, halogen substituted ethyl alcohols, i.e., trifluoriethanol, or even propyl or butyl alcohols are added to the tungsten hexachloride compound in molar amounts ranging from 1 to about 4 moles of the alcohol per mole of tungsten, the catalyst shows one or more of these advantages.

Representative but not exhaustive of the compounds of the formula $$R_1 \underset{\underset{R_3}{|}}{Al} - R_2$$

or (C) of the catalyst system are trialkylaluminums, such as triethylaluminum, triisobutylaluminum and the like; dialkylaluminum halides, such as diethylaluminum chloride; diethylaluminum bromide and the like; mixtures of dialkylaluminum halides and alkylaluminum dihalides, such as ethylaluminum sesquichlorides; and alkylaluminum dihalides, such as ethylaluminum dichloride, ethylaluminum dibromide and the like.

The major effect of the organosilicon component (A) of the catalyst system can be readily ascertained by comparing the cis vinylene content of the polymers obtained, when it is employed, with those obtained by the same (B) and (C) combination of the catalyst in the absence of (A). In some cases, for instance, where (B) and (C), in combination alone, give a polymer with a cis double-bond content as low as 21 percent, the addition of (A) to the monomer solution prior to the employment of the same (B)/(C) combination, using otherwise identical conditions, results in the formation of a polymer with a cis double-bond content of better than 92 percent. Although it is not known with any certainty why component (A) is critical to the stereoselectivity shown by the catalyst system, it is believed that these silicon compounds serve, in some way, as chelating agents, and, as such, modify the active tungsten catalyst specie. The basis for this belief lies partly in the observation that the number of Y substituents as defined for (A), must be at least 2. For example, it is found that whereas divinyldiphenyl silane is highly effective in the system, mono-vinyl silanes are only slightly effective, even when employed in amounts allowing for equal concentrations of vinyl groups.

The polymerizations of this invention may be conducted in solution or in bulk. When the polymerization is carried out in solution, solvents which do not adversely affect the polymerization are required. Such solvents meeting this specification are liquid aromatic hydrocarbons, such as benzene, chlorobenzene and toluene; and liquid aliphatics such as pentane, hexane, cyclohexane and the like.

It has been found that good results are obtained in the practice of this invention when the molar relationship between the three catalyst components (A), (B) and (C), as previously defined, are within a molar ratio of (A)/(B) ranging from 0.1/1 to 3/1, and a molar ratio of (C)/(B) ranging from 1/1 to 10/1. More preferred are (A)/(B) molar ratio of 0.5/1 to 1.25/1 and (C)/(B) molar ratio of 1/1 to 4/1.

The catalysts employed in this invention are prepared by mixing the components by known techniques. Thus, the catalysts may be prepared by "pre-formed" or in-situ techniques. In the "pre-formed" method, the catalyst components are mixed together prior to exposure of any of the catalyst components to the cyclic monomers to be used in the polymerization reaction. In the in-situ method, the catalyst components are added separately to the cyclic monomers in the polymerization mixture. In the practice of this invention, the latter method is preferred, and in the preferred order wherein the silicon compound (A) is added first, then the tungsten halide (B), and, finally, the aluminum component (C).

The amount of catalyst employed in the polymerization reactions may range over a wide concentration and depends upon a number of factors, such as the purity of the reactants, the reaction times desired and the temperature employed. Successful polymerization reactions can be conducted wherein the amount of catalyst is about 1 part by weight of the (B) component per 2,500 parts by weight of the monomer employed, with the proper molar ratio of (A)/(B) and (C)/(B) being adjusted accordingly.

Temperatures at which the polymerization reactions can be carried out can also be varied over a wide range from extremely low temperatures, such as −40°C up to high temperatures such as 150°C and are, thus, not critical. In the practice of this invention, however, it is generally preferred to conduct the reaction at a temperature in the range of −10°C to about 25°C. Although the cis/trans ratio of the double bond content of the polymer product has not been found to be changed drastically by variations of the temperatures within the preferred range, it has been noted that, in general, a slightly higher cis double bond content is obtained in the polymer when the polymerizations are conducted at the lower end of the temperature range, all other factors being equal.

The control of the molecular weight of the homopolymers and copolymers of the present invention can be conveniently carried out by the incorporation of minute amounts of acyclic olefins in the respective polymerization recipes. The process by which the molecular scission can occur in the metathesis of a —CH=CH—vinylene main chain double bond and the vinylene —CH=CH— of the added acyclic olefin is

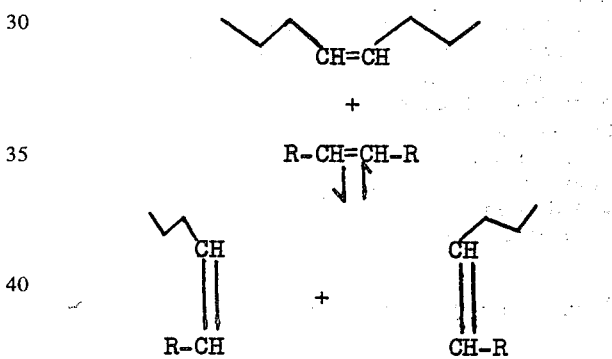

A noteworthy feature of the catalyst system of this invention is that, during the course of a given polymerization, the cis/trans ratio of the double bond content of the polymer generally remains fairly constant. That is, little change is noted in the "cis content" of the final polymer product when compared, for example, with a sample of the polymer taken after 5 percent monomer-to-polymer conversion. Moreover, no significant decrease in the cis-double bond content of the polymer is generally found when the polymerization, after complete conversion of monomer to polymer, is allowed to remain unterminated for long periods of time. All of this indicates that the inclusion of the organosilicon, as defined in this invention, in the catalyst system makes the combination of (A), (B) and (C) of the catalyst system truly a cis-directing catalyst when used in the ring-opening polymerization of cyclooctene and/or 1,5-cyclooctadiene.

As stated earlier, the essential difference between polybutenamer, prepared by the ring-opening polymerization of 1,5-cyclooctadiene, and polybutadiene, prepared by the addition polymerization of 1,3-butadiene, is the total absence of any vinyl side chain units in the former. Hence, the polymers obtained from 1,5- cyclooctadiene by the process described in this invention represent, in effect, "vinyl-free" high cis-1,4-polybutadiene rubber.

The polymers produced by the practice of this invention can be employed as rubbers to make various elastomeric articles such as rubber goods, shoe soles and heels, industrial belts and vehicle tires. They may be reinforced with carbon black, pigmented with various materials such as rubber pigments and fillers. They may be cross-linked or vulcanized in the conventional manner by the use of sulfur vulcanization techniques or can be cross-linked by exposure to ionizing radiation in the conventional manner.

The practice of this invention is further illustrated by reference to the following examples which are intended to be representative rather than restrictive of the scope of the invention. Unless otherwise indicated, all parts and percentages are by weight.

In the following examples the monomer solutions were prepared by passing a 20 percent solution of freshly distilled cycloolefin in n-hexane through a column packed with silica-gel and alumina.

The polymerizations were carried out in previously dried 4-oz bottles to which 50 ml samples of the column-passed monomer solution were charged under nitrogen. Self-sealing rubber-lined caps were used to seal the bottles.

The tungsten halide catalyst derivatives (A) were prepared by treating 0.05 M benzene solutions of $WCl_6$ with one-to-three fold molar equivalents of an alcohol or phenol, (as indicated below), and sparging the solutions with nitrogen several minutes until all of the HCl gas was removed.

All of the catalyst components were added to the monomer solutions in the bottles by syringe injection through the self-sealing rubber lined caps.

Octene-2, when employed as molecular weight regulator, was added in a similar manner prior to the addition of the catalyst.

The % cis-double bond content of each sample was calculated from the expression (100 minus the % trans double bond content). The latter was estimated from the infrared absorbance at 967 cm$^{-1}$ which was taken of each sample using 1 or 2 percent solutions in $CS_2$.

EXAMPLE I

To a control bottle containing 50 milliliters (ml) of a 20 percent by weight solution of 1,5-cyclooctadiene (COD) in n-hexane were added 0.4 ml of a 0.05 Molar (M) solution of $(CF_3CH_2OH)_3 \cdot WCl_6$ and 0.4 ml of a 0.2 M solution of ethylaluminum dichloride (EADC). After 2 hours, the polymerization was terminated with a small amount of isopropanol, and the polymer cement dried. A 96 percent yield of polybutenamer rubber was obtained which upon analysis indicated a cis double bond content of 21 percent.

EXAMPLE II

To a bottle containing 50 ml of 20 percent solution of COD in n-hexane were added 0.45 ml of a 0.05 M solution of divinyldiphenylsilane, 0.4 ml of the $(CF_3CH_2OH)_3 \cdot WCl_6$ solution, and 0.4 ml of the EADC solution. After 2 hours the polymerization was terminated and the sample dried as described in Example I. A 93 percent yield of polybutenamer rubber was obtained which upon analysis showed a cis double bond content of 92 percent.

EXAMPLE III

In the manner described in Example II, 50 ml of the 1,5-COD monomer solution was treated with 0.45 ml of a 0.05 M solution of dimethoxydiphenylsilane, 0.4 ml of the $(CF_3CH_2OH)_3 \cdot WCl_6$ solution, and 0.4 ml of the EADC solution. A similar work-up procedure produced a 94 percent yield of rubber having a cis double bond content of 86 percent.

EXAMPLE IV

In the manner described in Example II, 50 ml of the 1,5-COD monomer solution was treated with 0.45 ml of a 0.05 M solution of tetravinylsilane, 0.4 ml of the $(CF_3CH_2OH)_3 \cdot WCl_6$ solution and 0.4 ml of the EADC solution. A similar work-up gave a 91 percent yield of rubber with a cis double bond content of 94 percent.

EXAMPLE V

To a control bottle containing 50 ml of the 1,5-COD monomer solution were added 0.4 ml of a 0.05 M solution of $(CH_3CH_2OH)_3 \cdot WCl_6$ and 0.4 ml of the 0.2 M EADC solution. After 4 hours, the reaction solution was worked-up in the manner described in Example I. A 96 percent yield of rubber was obtained having a cis double bond content of 78 percent.

EXAMPLE VI

In the manner described in Example II, 50 ml of the 1,5-COD monomer solution was treated with 0.4 ml of an 0.05 M solution of tetravinylsilane, 0.4 ml of the $(CH_3CH_2OH)_3 \cdot WCl_6$ solution and 0.4 ml of the EADC solution. After a similar work-up procedure, a 95 percent yield of rubber was obtained having a cis double bond content of 93.5 percent.

EXAMPLE VII

To a control bottle containing 50 ml of a 20 percent by weight n-hexane solution of cyclooctene (CO), containing 700 parts per million (ppm) of octene-2-, was added 0.5 ml of 0.05 M $(CH_3CH_2OH)_3 \cdot WCl_6$ and 0.45 ml of 0.2 M EADC. After 45 minutes, the reaction was terminated and the rubber isolated in the manner described in Example I. A 93 percent yield of polyoctenamer was obtained having a cis double bond content of 75.5 percent.

EXAMPLE VIII

To a bottle containing 50 ml of a 20 percent by weight n-hexane solution of cyclooctene were added 0.55 ml of 0.05 M divinyldiphenylsilane, 0.5 ml of 0.05 M $(CH_3CH_2OH)_3 \cdot WCl_6$ and 0.45 ml of 0.2 M EADC. After 90 minutes the polymerization was terminated and the polymer isolated as described above. A 63 percent yield of rubber was obtained having a cis double bond content of 96.5 percent.

EXAMPLE IX

In the manner described in Example VIII, 50 ml of the cyclooctene solution was treated with 0.55 ml of 0.05 M $(C_6H_5)_2Si(OCH_3)_2$, 0.5 ml of $(CF_3CH_2OH)_3 \cdot WCl_6$ and 0.45 ml of 0.2 M EADC. A similar work-up procedure was used to isolate the rubber in a 30 percent yield. The cis-vinylene content of the rubber was found to be 91.4 percent.

The results of Examples I–IX are summarized in Table 1.

TABLE 1

Solution[a] Polymerizations[b,c] of Cycloolefins[d]

| Examples | Monomer | $R_{4-n}Si(Y)_n$ (A) | $R_{(m-n')}WX_{n'}$ [e] (B) | $R_1—Al—R_3$ $R_2$ (C) | Vinylene Units cis |
|---|---|---|---|---|---|
| 1 (control) | 1,5-COD | — | $(CH_3CH_2O)_3WCl_3$[e] | $EtAlCl_2$ | 21% |
| 2 | " | $(C_6H_5)_2Si(CH=CH_2)_2$ | " | " | 90% |
| 3 | " | $(C_6H_5)_2Si(OCH_3)_2$ | " | " | 86% |
| 4 | " | $(CH_2=CH)_4Si$ | " | " | 94% |
| 5 (control) | " | — | $(CH_3CH_2O)_3WCl_3$ | " | 78% |
| 6 | " | $(CH_2=CH)_4Si$ | " | " | 93.5% |
| 7 (control) | Cyclooctene | — | $(CF_3CH_2O)_3WCl_3$ | " | 75.5% |
| 8 | " | $(C_6H_5)_2Si(CH=CH_2)_2$ | " | " | 96.5% |
| 9 | " | $(C_6H_5)_2Si(OCH_3)_2$[f] | " | " | 91.4% |

[a]20% solns in n-hexane;
[b]24°C;
[c](A)/(B)/(C) molar ratios = ca. 1.25/1/4, unless otherwise indicated.
[d]Monomer/(B) wt. ratio = ca. 2,300/1;
[e]estimated average number of substitutents per W atom;
[f](A)/(B)/(C) = 0.5/1/4

In the following examples the polymerization reactions were bulk polymerizations carried out using undiluted 1,5-COD which was purified in the same manner as that described for the hexane-diluted monomer solutions above.

EXAMPLE X

To a control bottle containing 22 gms of the 1,5-COD monomer were added 0.6 ml of a 0.05 M solution of $C_6H_5OH.WCl_6$ and 0.4 ml of a 0.2 M solution of diethylaluminum chloride (DEAC). After 1 hour the polymerization was terminated and dried as described above for the solution polymers. A 96 percent yield of rubber was obtained having a cis double bond content of 59 percent.

EXAMPLE XI

To a bottle containing 22 gms of the 1,5-COD monomer were added 0.6 ml of a 0.05 M solution of tetravinylsilane, 0.6 ml of the 0.05 M $C_6H_5OH.WCl_6$ solution, and 0.4 ml of the DEAC solution. After 1 hour the polymerization was terminated and the cement dried. A 75 percent yield of rubber was obtained which possessed a cis double bond content of 96 percent.

While certain representative embodiments and details have been shown for the purpose of illustrating the invention, it will be apparent to those skilled in this art that various changes and modifications may be made therein without departing from the spirit or scope of the invention.

What is claimed is:

1. The method which comprises polymerizing a cycloolefin selected from the group consisting of cyclooctene and 1,5-cyclooctadiene to polyalkenamers having cis vinylene contents of at least 86% by means of a catalyst system comprising (A) an organosilicon compound of the formula $R_4—nSi(Y)_n$ wherein R represents any hydrocarbon fragment from the group of an alkyl, alkenyl or aryl radical and Y is selected from the group consisting of vinyl alkylidenyl, alkoxy, aryloxy and aralkoxy radicals and n being at least 2 and (B) a tungsten halide salt of the general formula $R_{m-n'}$ $WX_{n'}$ wherein X represents chlorine or bromine and R is selected from the group consisting of alkoxy, aryloxy, haloalkoxy, alkaryloxy and acetyl acetonyl radicals $m$ being 6 when $X = Cl$ or 5 when $X = Br$ and wherein $n'$ is 3 to 6 inclusive when $X = Cl$ or 3 to 5 inclusive when $X = Br$ and (C) an organoaluminum compound of the formula

wherein $R_1$, $R_2$ and $R_3$ may independently represent an alkyl, aralkyl radical or a halogen atom, and wherein the molar ratio of (A)/(B) ranges from 0.1/1 to 3/1 and the molar ratio of (C)/(B) ranges from 1/1 to 10/1.

2. The method of claim 1 in which the organosilicon compound contains a vinyl radical.

3. The method of claim 1 in which the organoaluminum compound is ethyl aluminum dichloride.

4. The method of claim 1 in which the tungsten halide salt is tungsten hexachloride.3 ethyl alcohol complex.

5. The method of claim 1 in which the organosilicon compound is tetravinylsilane.

6. The method of claim 1 in which the organosilicon compound is diphenyldivinylsilane.

7. A method according to claim 1 in which the organosilicon compound is diphenyldivinylsilane, the organoaluminum compound is ethyl aluminum dichloride and the tungsten halide salt is tungsten hexachloride modified with three moles of ethyl alcohol.

8. The method according to claim 1 in which the organosilicon compound is tetravinylsilane, the organoaluminum compound is ethylaluminum dichloride and the tungsten halide salt is tungsten hexachloride modified with three moles of ethyl alcohol.

* * * * *